Feb. 11, 1930.

J. MAYER

Re. 17,585

PERMANENT HAIR WAVING APPLIANCE

Original Filed March 19, 1925

INVENTOR
Josef Mayer

BY Harvey R. Haugood
ATTORNEY

Reissued Feb. 11, 1930

Re. 17,585

UNITED STATES PATENT OFFICE

JOSEF MAYER, OF KARLSBAD, CZECHOSLOVAKIA, ASSIGNOR TO THE PHILAD COMPANY, OF CLEVELAND, OHIO, A CORPORATION OF OHIO

PERMANENT-HAIR-WAVING APPLIANCE

Original No. 1,619,794, dated March 1, 1927, Serial No. 16,784, filed March 19, 1925, and in Czechoslovakia April 3, 1924. Application for reissue filed March 2, 1929. Serial No. 344,056.

This invention relates to apparatus for waving hair upon the human head, and more particularly to apparatus for heating the hair to produce lasting or "permanent" waves.

An object to the invention is to provide an improved waving apparatus which will be simple in construction and operation.

Other objects will hereinafter appear.

The invention will be better understood from the description of one practical embodiment thereof illustrated in the accompanying drawing, in which.

Figure 1:
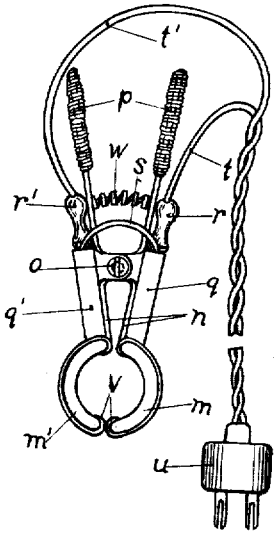
Figure 1 is an end elevation of a heater embodying the invention.
Figure 2:
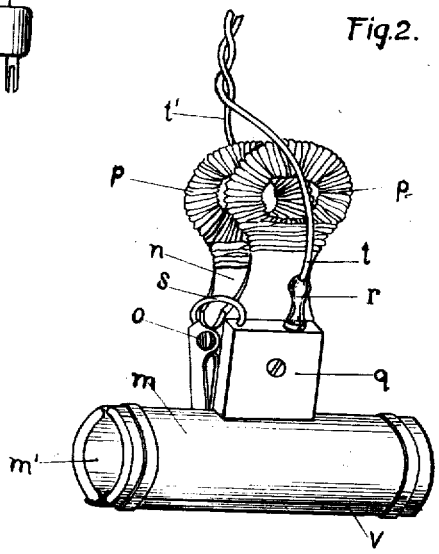
Figure 2 is a perspective view of the apparatus of Fig. 1.

There are at present two styles of permanent hair curling or hair waving in use. In one a strand of hair is coiled from the root helically upon a curling rod, whilst in the other, the hair strands are wound from the free end, turn upon turn, upon a curler, the hair in the former case being bunched together to form a substantially round strand and in the latter case spread out more or less in the same plane to form a flat strand. After winding upon the curler the hair is in both cases subjected to the action of a suitable heating device to impart permanency to the curl in the case of the first process and to the wave in the second case.

The heating device for permanent curling generally consists of a sleeve like heating body, adapted to be passed over the curler when wound with hair and either left open or closed at its ends during the heating process. Such a sleeve like heating device can, however, not be used in the case of the waving of a flat hair strand inasmuch as the hair extending between the curler and the head along the length of the curler prevents its application to the curler.

The hair strand after being wound on a curler, and suitably wrapped up and preferably enclosed in a perforated metal sheath and treated with lotions, as described in my Patent No. 1,622,957, is surrounded by the electric heating apparatus illustrated in the drawings.

This apparatus should be made so as to distribute heat over the whole length of a hair strand equally, in order to carry the process out uniformly. The heating device consists as shown of arcuate heating bodies which can be separated sufficiently by means of pivoted handles to enable the heating device to be passed laterally over the wrapped and enclosed hair strand.

The heating device is so arranged that the operator by the same hand that applies the device to the hair is also able to switch the current on or off, thus releasing the operator's other hand for any other service.

Resistance wires are wound between mica sheets or the like and enclosed in two casings $m$ and $m'$ of arcuate shape, made of aluminum or other suitable material. These casings are attached to handle portions $n$ pivoted together at $o$ like the halves of a spring clothes pin and provided at their other ends with heat and electricity insulating handles $p$. A spring $w$ is arranged between the handles $n$ to force them from each other and thereby hold the heating members in closed position. The current for the resistance wires in the casings $m$, $m'$ passes through lead in wires enclosed completely in the insulating casings $q$ and $q'$. These casings $q$, $q'$ are provided with sockets for plugs $r$, one socket being provided in each casing, so that the two plugs connected with the current supply wires are separated from each other. The other terminals of the casings $q$, $q'$ are connected together by means of a wire $s$.

The current thus passes through the wire $t$, plug $r$, and casing $q$ to the heating element in casing $m$ and then through the wire $s$ to the heating element in casing $m'$; thence to the plug $r'$ on passing through casing $q'$ and by wire $t'$ back to the source of supply. The resistances in the cases $m$ and $m'$ are of such a value and arranged in any known or desired manner so as to produce an amount of heat suitable for waving the hair.

The metal casings $m$ and $m'$ are covered along the edges by protecting strips $v$ of insulating material (suitably glazed cardboard), which can be easily removed. These strips are suitably bent to shape and are fixed at both ends by means of clamps or other means.

This protecting means should be renewable in order to preclude any harmful influence from the electric current; the edges of the casings *m* and *m'* should always be completely dry, which can be effected by always using dry and interchangeable cover bars.

In use the heating appliance should remain on for some 12 to 15 minutes on the wrapped up hair strands, and any uncomfortable warmth at the head may be dispelled by a current of air.

After removal of the heating appliance, the hair strands are moistened with a solution consisting of 900 grams of water, 100 grams of acetic acid, two grams of tartaric acid and a few drops of nitro-benzole. After such moistening, the hair may be washed in the usual way, but this is not necessary for the production of permanent hair waves.

A number of heating appliances are required and they are best placed on a stand, from which they may hang by cables which serve to conduct the current, in such a way as to be adjustable in height.

While I have described the illustrated embodiment of my invention in some particularity, this is done by way of illustration only and not by way of limitation and it is obvious that many variations, modifications and other embodiments will readily occur to those skilled in the art to which it appertains and I do not therefore limit myself to the precise details shown and described but claim as my invention all embodiments coming within the scope of the subjoined claims.

I claim:

1. Permanent hair waving apparatus, including a heating apparatus comprising two arcuate electrically heated side members, spring means for pressing said members toward each other, arms carrying said members and pivoted together, said arms having insulated handles, and insulating casings on the arms and having sockets for plugs on the current supply wires.

2. Permanent hair waving apparatus, including a heating apparatus comprising two arcuate electrically heated side members, spring means for pressing said members toward each other, arms carrying said side members and pivoted together, and plug sockets for the connecting plugs of a current supply circuit disposed on said arms.

3. Permanent hair waving apparatus, including a heating apparatus comprising two arcuate electrically heated side members, spring means for pressing said members toward each other, arms carrying said side members and pivoted together, bent strips of insulating material for application to the edges of the side members, and means for fixing said strips to said members in a detachable manner.

4. A heater comprising a pair of rigid levers pivoted intermediate their ends, an arcuate casing with straight parallel edges carried by one end of each lever, a heat insulating grip at the other end of each lever, electrical heating elements within said casings, and a spring between said levers pressing said casings toward each other.

5. A heater comprising two arcuate members arranged to substantially enclose a strand of hair on all sides except that adjacent the scalp of the wearer, electrical heating means associated therewith, a pair of levers pivoted together intermediate their ends, each lever being rigidly attached to one of said arcuate members at one end, and having its other end formed into a heat insulating handle, and a spring means pressing said members toward each other.

6. A heater comprising a pair of rigid levers pivoted intermediate their ends, an arcuate casing carried by one end of each lever, a heat insulating grip at the other end of each lever, electrical heating elements within said casings, and a terminal-enclosing insulating cover carried by each lever.

7. A heater comprising two arcuate members arranged to substantially surround a flat spirally wound strand of hair and in this position to have their edges adjacent the wearer's scalp spaced from each other throughout their length, electrical heating means associated therewith, a pair of levers pivoted intermediate their ends, each lever being rigidly attached to one arcuate member and carrying a heat insulating handle.

In witness whereof, I have hereunto set my hand this 16th day of May, A. D. 1929.

JOSEF MAYER.

DISCLAIMER

Re. 17,585.—*Josef Mayer*, Karlsbad, Czechoslovakia. PERMANENT-HAIR-WAVING APPLIANCE. Patent dated February 11, 1930. Disclaimer filed April 4, 1933, by the assignee, *The Philad Company*.

Disclaimer is hereby entered to claims 4, 5, 6, and 7 in the above identified Letters Patent, the said claims being in the following words, to wit:

"4. A heater comprising a pair of rigid levers pivoted intermediate their ends, an arcuate casing with straight parallel edges carried by one end of each lever, a heat insulating grip at the other end of each lever, electrical heating elements within said casings, and a spring between said levers pressing said casings toward each other.

"5. A heater comprising two arcuate members arranged to substantially enclose a strand of hair on all sides except that adjacent the scalp of the wearer, electrical heating means associated therewith, a pair of levers pivoted together intermediate their ends, each lever being rigidly attached to one of said arcuate members at one end, and having its other end formed into a heat insulating handle, and a spring means pressing said members toward each other.

"6. A heater comprising a pair of rigid levers pivoted intermediate their ends, an arcuate casing carried by one end of each lever, a heat insulating grip at the other end of each lever, electrical heating elements within said casings, and a terminal-enclosing insulating cover carried by each lever.

"7. A heater comprising two arcuate members arranged to substantially surround a flat spirally wound strand of hair and in this position to have their edges adjacent the wearer's scalp spaced from each other throughout their length, electrical heating means associated therewith, a pair of levers pivoted intermediate their ends, each lever being rigidly attached to one arcuate member and carrying a heat insulating handle."

[*Official Gazette April 25, 1933.*]